Reissued Dec. 17, 1929 Re. 17,523

UNITED STATES PATENT OFFICE

RICHARD ERICSON, OF CHICAGO, ILLINOIS, ASSIGNOR TO UNITED STATES GYPSUM CO., OF CHICAGO, ILLINOIS, A CORPORATION OF ILLINOIS

LIGHT-WEIGHT CERAMIC MATERIAL AND PROCESS OF MAKING THE SAME

No Drawing. Original No. 1,702,076, dated February 12, 1929, Serial No. 226,259, filed October 14, 1927. Application for reissue filed October 11, 1929. Serial No. 399,088.

This invention relates to a porous and light weight cellular ceramic product, and a method for producing and manufacturing the same commercially.

The use of foam or other density reducing substance in connection with cemetitious materials to form porous cellular compositions when set and hardened to final state with water, is becoming established as one commercial means of producing a light weight material. I am not aware that anything of this principle has been applied to the production of ceramic materials where an argillaceous, earthy material is given a porous structure by admixture with a tenacious foam reducing agent and subsequently this porous argillaceous material is heat-treated to render its cellular structure fixed in a finished ceramic product.

A comparatively light porous material suitable for structural purposes or suitable as a heat insulator can be made from clay or other argillaceous earthy material, by first forming a plastic mixture of the earthy material with water, then mixing in a previously prepared tenacious foam or other density to uniform admixture, next forming the mass into a cast or shaped product of any desired form, then drying this cast to preserve its cell structure, and finally baking or burning this dried cast until a hardened mass results which retains permanently fixed the porous structure afforded by the foam addition.

In carrying on my invention I can use the ordinary earthy materials such as clay, shale, etc. generally used as raw materials for producing ceramic products. Also these may be augmented with other special substances like flint, feldspar, "grog", etc. for specific properties as needed, either during some step in the manufacturing or in the final product. These raw materials are reduced to the desired fineness state through suitable disintegration or grinding means and rendered plastic with water. However, in my process I reduce to perhaps a more fluid plastic state than is the ordinary practice in the production of common ceramic products like brick or tile. This is usually necessary because the addition of foam to provide the porous structure has bulking effect, and additional fluidity, in the plastic earthy material, is needed to take care of this and to fully preserve the foam from breaking down somewhat as it does if the plastic mixture itself is too stiff. The material for forming the foam may consist of any number of materials capable of producing tenacious foam from a water solution such as soap bark, licorice, commercial plaster retarder, glue, soap, resin soap, and various admixtures of these, etc. The foam itself may be made by beating the water solution violently or by introducing a current of air into the solution with agitation, or by any other means of suitably producing such a foam. The more tenacious the foam, as produced, is, the better it is applicable in my invention.

In the production of light weight shale brick, I take shale as used in the manufacture of ordinary brick and tile and grind it so that it can be readily mixed with water. Sufficient water is then mixed with it to form a plastic mass of such consistency or fluidity that foam can readily be mixed thereto. With certain shales I have used, this is about six tenths of one part of water by weight to one part of ground shale. The foam used is made by dispersing air into a solution composed of three quarters of one part of powdered soap bark suspended in one hundred parts of water, and this foam if properly prepared is very stable and preserves its structure for a long time. The quantity of foam used is about five parts of foam by volume to one part by volume of the shale and water mixture, and will give a resultant ceramic product having a density of about thirty pounds per cubic foot. The mixture of shale, water and foam is then dried and after drying it is baked or burned at about the temperature and method used in burning the ordinary brick or tile products made from the same shale, care being taken not to fuse or melt the product during the burning or firing stage. After the burning, the hard porous product is ready for use in a variety of ways. If the original shape of the cast was a brick, this finished porous brick is then available for an insulating backingup brick in high temperature insulation work. Or the burned product can be crushed and sized into an aggregate for use with a cementing material to give a moulded and cast structure prepared as desired on the job. One use of this crushed product is as a light weight aggregate in the production of Portland cement concrete.

I have noticed in some cases where extremely light weight products (25–30 pounds per cubic foot density) are desired that these foam clay casts when dried exhibit some cracking and shrinking. This of course, depends somewhat on the nature of the clay or shale used as a base, and is what is ordinarily experienced in the general manufacture of ceramic products. But in my light weight foam process, the natural tendency of the clay or shale in this direction of course, is augmented, because after the foam addition the composite mix is less dense and consequently somewhat fragile. Thus, there is greater opportunity for shrinking and cracking during drying to manifest itself. If the finished ceramic products are to be used as crushed aggregates this of course is immaterial, but if the finished porous light weight ceramic product is to be used intact itself for structural purposes and thus must retain the form and size in which it was cast, some additions must be made to the clay or shale just as in ordinary ceramic practice to offset this shrinkage and cracking. The addition of silica, flint, "grog", and other coarser body materials is useful in this capacity, and I have also found a mixture of calcined gypsum or plaster of Paris sets rapidly with water and thus hardens the cellular clay mass sufficiently to withstand the shrinking effect induced by the later drying. The calcined gypsum mixed with water can be added to the mixture of argillaceous material and foam with good results. Accelarating the set by the calcined gypsum decreases the time required before the subsequent mixture stiffens. However, when gypsum is used, more care must be taken in burning the dried porous product because usually the fusing or melting point of such mixture is lowered by the gypsum addition.

Many modifications of this invention will suggest themselves and I do not wish to be limited in various applications of this principle, for the various modifications that suggest themselves do not depart from the spirit of this invention. Other types of argillaceous material other than the natural earthy materials used may suggest themselves such as built-up artificial refractory raw materials made plastic by only small additions of clays or shales; and many types of foam or other density reducing agents with greater or less stability than the soap bark foam cited may be used. Also other methods of drying and burning may be used than merely preparing unit casts drying and burning the same. For example, the casts may be partially dried and then placed in a rotary kiln where they can be further dried and burned in one operation if the material is intended for use primarily as an aggregate.

Having thus described my invention, what I claim is:

1. A porous ceramic material comprising the burned product resulting from heat treating a mixture of foam and argillaceous material.

2. A porous light weight ceramic product comprising burned argillaceous material made porous by foam addition while plastic.

3. A light weight structural material comprising the burned product resulting from heat treating argillaceous material in which a tenacious foam is incorporated prior to drying and burning.

4. A porous light weight material comprising the burned product resulting from heat treating a mixture of argillaceous substance, tenacious foam, and substances adapted to prevent excessive shrinking and cracking during drying.

5. A light weight ceramic material comprising the burned product resulting from heat treating a mixture of argillaceous material, foam, calcined gypsum, and water.

6. A porous ceramic material comprising the burned product resulting from heat treating a mixture of one part by volume of a plastic mixture of argillaceous material and water, with five parts of tenacious foam.

7. A cellular ceramic product comprising the burned product resulting from heat treating a mixture of one part by volume of a plastic mix of argillaceous material and water, four parts of tenacious foam, and one third part of calcined gypsum.

8. The process of manufacturing a porous product comprising forming a fluid plastic mixture of finely divided argillaceous material with water, incorporating therein a tenacious foam, shaping and drying this admixture and finally heat treating a dried porous mass to maintain a substantial hardened cellular product.

9. The process of manufacturing a porous ceramic material comprising the incorporation of tenacious foam into a fluid plastic mixture of argillaceous substance and water, the foam volume being in excess of the volume of argillaceous water mixture used, casting this resultant mixture into desired shape, drying, and finally burning the dried porous mass at a temperature below its fusion point to maintain its porous structure throughout the burning process.

10. The process of manufacturing a porous ceramic product comprising adding to a plastic mixture of argillaceous substance, foam and water, calcined gypsum to prevent shrinkage during subsequent moisture loss, drying this composite mass, and finally heat treating the dried porous mass at a temperature below its fusion point to yield a hardened porous product.

11. A light weight structural material comprising the burned product resulting from heat treating argillaceous material in which a density reducing agent is incorporated prior to drying and burning.

12. A porous light weight material comprising the burned product resulting from heat treating a mixture of argillaceous substance, a density reducing agent, and substances adapted to prevent excessive shrinking and cracking during drying.

13. A light weight ceramic material comprising the burned product resulting from heat treating a mixture of argillaceous material, a density reducing agent and calcined gypsum.

14. The process of manufacturing a porous product comprising forming a fluid plastic mixture of finely divided argillaceous material with water, incorporating therein a density reducing agent, shaping and drying this admixture, and finally heat treating the dry porous mass to maintain a substantially hardened, cellular product.

15. The process of manufacturing a porous ceramic product, comprising adding to a plastic mixture of argillaceous substance, a density reducing agent and water and calcined gypsum to prevent shrinkage during subsequent moisture loss, drying this composite mixture, and finally heat treating the dry porous mass at a temperature below its fusion point to yield a hardened, porous product.

RICHARD ERICSON.